Patented Mar. 1, 1949

2,463,219

UNITED STATES PATENT OFFICE 2,463,219

IMPROVING THE MILLABILITY OF BUTADIENE-STYRENE INTERPOLYMERS

Joseph H. Trepagnier, Wilmington, Del., assignor to E. I. du Pont de Nemours & Company, Wilmington, Del., a corporation of Delaware No Drawing. Application January 10, 1946, Serial No. 640,374

2 Claims. (Cl. 260—29.7)

This invention relates to the improvement of the millability of the synthetic rubber-like materials (hereinafter called "elastomers") prepared by the alkaline emulsion polymerization of mixtures of butadiene-1,3 and styrene or mixtures of butadiene-1,3, styrene and a third component such as dimethyl vinylethynyl carbinol, by treatment of their latices with aromatic mercaptans and oxygen.

The plasticization of synthetic elastomers by adding aromatic mercaptans to their latices is disclosed in U. S. Patent 2,316,949. However, by applying the teaching of the example of this patent to GR-S latex (which is the U. S. Government name applied to a butadiene/styrene elastomer), no improvement in millability was obtained over that of untreated material. U. S. Patent 2,234,204 to Du Pont describes the use of a wide variety of sulfur compounds, including aromatic mercaptans, for the plasticization of interpolymers made in the presence of elemental sulfur. This patent discloses that the aromatic mercaptan can be added to the elastomer either in the dry form or in the form of latex. Addition to the latex, however, merely serves as a convenient way of dispersing the mercaptan, and no advantages are cited for the addition to the latex rather than to the dry polymer. The softening process described in U. S. Patent 2,234,204 probably takes place almost entirely in the dry polymer, and it is to be noted that the polymers disclosed in this patent are prepared in acid system. It is well known that polymers produced in acid systems differ considerably from those made in alkaline or neutral systems.

It is an object of the present invention to provide a method for improving the millability of synthetic elastomers comprising interpolymers of butadiene-1,3 and styrene. A further object is to provide a method for reducing the time required for incorporating pigments and compounding ingredients in these synthetic elastomers and to provide a simple and relatively rapid chemical method for accomplishing the above objects. Other objects will be apparent from the description of the invention.

I have found that, by treating the latices of the synthetic elastomers comprising interpolymers of diene-1,3, styrene and a third component such as dimethyl vinylethynyl carbinol with aromatic mercaptans and oxygen before coagulating and drying the rubber-like material, a marked improvement in their millability can be obtained so that the time required for the milling and compounding of such elastomers can be materially reduced.

To be able to incorporate compounding ingredients readily into rubber-like materials on the usual smooth roll rubber mill, it is important to have a continuous band of the elastomer on one of the rolls before beginning the addition of the compounding ingredients. The usual practice is to mill the elastomer until such a continuous band, which is essentially free from holes, is obtained. This preliminary milling consumes power and time, and, consequently, it is highly desirable for the elastomer to band rapidly on the mill. To describe an elastomer's ability to form a continuous band on the mill as described above, the term "millability" is used. A rubberlike material having good millability will, of course, band more rapidly than one with poor millability.

It is well known that synthetic rubber-like polymers prepared by alkaline emulsion polymerization of butadiene-1,3 and styrene, particularly those which give high tensile strength vulcanizates, frequently have poor millability. I have now found that the millability of these butadiene-1,3/styrene interpolymers can be greatly improved by treating the latex of the interpolymer with an aryl mercaptan and oxygen at a slightly elevated temperature. By aryl mercaptan is meant a compound containing one or more —SH groups connected directly to an aromatic hydrocarbon ring of the benzene or naphthalene series.

The plasticization of butadiene-1,3 interpolymers by the addition of aromatic mercaptans to their latices but not followed by treatment with oxygen at a slightly elevated temperature is described in U. S. Patent 2,316,949 to Garvey. In contrast to my present process, the method of U. S. Patent 2,316,949 gives no improvement in the millability of a butadiene-1,3/styrene interpolymer although both methods plasticized the To insure good dispersion of the aryl mercaptan in the latex, it is advantageous to add it in the form of an aqueous dispersion or emulsion. Dispersion of the mercaptan in the latex is also aided by mixing it with a small portion of the latex before adding it to the main body of the latex. In general, the preferred amount of mercaptan is from 1% to 4% by weight, based on the elastomer content of the latex.

Our preferred temperature range is from 50° to 95° C. The preferred time of reaction is from one-half to three hours, although a shorter time is sometimes advantageous.

The following examples are given to illustrate the invention. The parts used are by weight. In these examples, the millability of the sample was determined by the following procedure: A 35 gram sample of the polymer was placed on a rubber mill, the rolls of which were 2 inches in diameter and 6 inches long. The rolls, which both revolved at the same speed, were set 0.030 inch apart and 35° C. water was circulated through them. The polymer was milled until a continuous band (one having no holes) was formed. The time required to form a continuous band on the mill roll is called the "milling time" in the examples. The shorter the milling time, the better the millability of the sample.

The plasticity of the sample (measured before the milling test) was obtained by the method described by Williams [Industrial and Engineering Chemistry 16, 362 (1924)]. In this method, the thickness of a sample 2 cc. in volume in the form of a cylinder is measured when under a definite load. The term "plasticity number," as used in the examples, refers to the thickness in thousandths of an inch of the 2 cc. sample when kept under a weight of 5 kilograms in an oven at 80° C. for 3 minutes. The more plastic a material is, the lower will be its plasticity number.

Example 1

An emulsion of thio-alpha-naphthol was prepared as follows: A mixture of 50 parts of water, 1 part of 10% casein solution and 2.5 parts of triethanolamine was agitated with a high speed stirrer. To the agitated mixture was added slowly a mixture of 25 parts of thio-alpha-naphthol, 25 parts of benzene and 2.5 parts of oleic acid. After a few minutes' stirring, a relatively stable emulsion resulted. To 160 parts of a 35% latex, prepared by the emulsion polymerization of 25 parts of styrene and 75 parts of butadiene-1,3 in an alkaline aqueous soap solution containing 0.5 part of dodecyl mercaptan, was added 4.4 parts of the above thio-alpha-naphthol emulsion (2% thio-alpha-naphthol based on the weight of polymer in the latex). The mixture was heated to 80° C. and stirred and a gentle stream of air passed through the latex at this temperature for one hour. The latex was coagulated by adding saturated brine until a thick paste was obtained and then adding 10% acetic acid until the elastomer precipitated. The coagulum was extruded through a die containing holes 1/16 inch in diameter, washed in a large volume of water and dried at 120° C. for 15 minutes. For comparison, another sample of the latex was treated in exactly the same manner except that no thio-alpha-naphthol was added (this sample being known as the control), and a third sample was prepared with no treatment of the latex. Plasticity numbers and milling times for these samples were obtained by the methods described above. These results, and others which show the effect of varying the amount of thio-alpha-naphthol and the time and temperature of treatment, are given in Table I.

Table I

| Per cent Thio-alpha-Naphthol Added to Latex | Treatment of Latex with Air | | Milling Time, Mins. | Plasticity Number |
|---|---|---|---|---|
| | Time, Hrs. | Temp., °C. | | |
| 0 | No Treatment | | 47 | 188 |
| 0 (control) | 1 | 80 | 47 | 185 |
| 1 | 1 | 80 | 38 | 171 |
| 2 | 1 | 80 | 37 | 146 |
| 4 | 1 | 80 | 11 | 139 |
| 2 | 2 | 80 | 34 | 148 |
| 2 | 3 | 50 | 34 | 152 |
| 2 | 1 | 95 | 32 | 144 |

Example 2

Samples of the latex used in Example 1 were treated with other aryl mercaptans in a manner similar to that used in Example 1. The results are given in Table II.

Table II

| Mercaptan | Per Cent Added to Latex | Time of Treatment at 80° C. | Milling Time, Min. | Plasticity Number |
|---|---|---|---|---|
| | | Hours | | |
| None (control) | | 1 | 47 | 185 |
| "RPA" No. 3 [1] | 6 | 1 | 33 | 155 |
| "RPA" No. 4 [2] | 4 | 1 | 21 | 168 |
| Thiophenol | 4 | 2 | 35 | 145 |
| Mono-Thiocatechol | 4 | 2 | 33 | 152 |
| Thio-beta-Naphthol | 1.6 | 1 | 40 | 149 |

[1] A mixture of 36.5% xylyl mercaptan and 63.5% inert hydrocarbon.
[2] A mixture of aryl mercaptans (principally thio-alpha-naphthol) and inert hydrocarbons standardized as 50% thio-alpha-naphthol.

Example 3

To a 160 gram sample of the latex used in Example 1 was added 2% of thio-alpha-naphthol as an emulsion. This was allowed to stand at room temperature for 18 hours as described in U. S. Patent 2,316,949, and coagulated, washed and dried by exactly the same procedure used in above examples. The following results were obtained with this sample.

Milling time—48 minutes
Plasticity number—155.

By comparing these results with those in Table I, it is seen that this treatment gives no improvement in millability although it does increase the plasticity. (Thio-alpha-naphthol was used in this experiment rather than thio-beta-naphthol because the former is more active than the latter and would show up smaller effects.)

Example 4

To 160 parts of the latex used in Example 1, was added 4.4 parts of the thio-alpha-naphthol emulsion prepared in Example 1. The mixture was heated to 80° C. and a solution of 8 parts of 23.9% hydrogen peroxide in 20 parts of water was added over a period of 1 hour while the mixture was continually stirred. The latex was coagulated and the elastomer dried as in Example 1. The following results were obtained:

Milling Time—34 minutes
Plasticity Number—163.

The types of arylmercaptans which have been found to be operable in this process are illustrated by the following:

2-methyl-thiophenol
4-ethyl-thiophenol
4-isopropyl-thiophenol
2,4-diethyl-thiophenol
2-methyl-4-isobutyl-thiophenol
4-hydroxy-thiophenol
2-methyl-1-mercapto-naphthalene
1-isobutyl-2-mercapto-naphthalene
2,5-dimercapto-naphthalene
4,4'-dimercapto-diphenyl
2-mercapto-5-hydroxy-naphthalene.

In the specific examples above given, the 1,3-butadiene-styrene interpolymers have been employed to illustrate the invention. It is to be understood that the invention is also applicable to interpolymers of 1,3-butadiene-styrene which have been modified by a third polymerizable compound such as dimethylvinylethynylcarbinol, or related compounds. The invention is particularly applicable to those 1,3-butadiene-styrene elastomers in which the butadiene comprises at least 50% of the polymerizable materials and to those which may contain not over 10% of a third co-polymerizable material which has been incorporated to modify the characteristics of the butadiene-styrene elastomer.

The presence of oxygen together with the aromatic mercaptan is necessary for the operation of the process of this invention. This oxygen may be in the form of gaseous oxygen, used by itself or in admixture with other gases (which may be air), or it may be produced in situ by oxygen yielding compound such as hydrogen peroxide. The amount of oxygen necessary to produce the desired effect is substantially in excess of that which occurs in the latex when it is saturated with air at room temperature and pressure. At least 0.25 mol of oxygen per mol of mercaptan has been found necessary to insure good results.

Although, as illustrated in the examples, the preferred amount of mercaptan is from 1% to 4%, amounts ranging from 0.25% to 7% can be used. Similarly, the preferred temperature range is 50° to 95° C., although the process can be carried out at room temperature and by the use of pressure equipment at temperatures above 95° C.

The time required to carry out the process of course depends upon the amount of mercaptan used and the temperature of the treatment. With the preferred amounts of mercaptan and the preferred temperature range, treatment from 30 minutes to 3 hours is best. However, under suitable conditions of treatment, beneficial effects can be obtained with the time of treatment ranging from a few minutes to 12 hours or more.

By improving the millability as well as increasing the plasticity of butadiene-styrene interpolymers, this invention provides a method for materially decreasing the time required for incorporating compounding ingredients in these interpolymers. This results in decreased power consumption for compounding a given weight of elastomer, as well as lower labor costs and greater output per unit of equipment. These savings are accomplished by a simple chemical treatment requiring small quantities of chemicals.

In addition to the advantage of better millability, the present invention gives stocks which extrude, calender, and in general, process better than stocks not subjected to the process of this invention.

I claim:

1. In the process of preparing 1,3-butadiene-styrene elastomers in which the 1,3-butadiene-styrene interpolymer is produced by emulsion polymerization of the monomers, the steps which comprise incorporating in the butadiene-styrene elastomer latex from 1% to 4% of an arylmercaptan selected from the group consisting of the arylmercaptans of the benzene and the naphthalene series, and incorporating in said latex, after the incorporation of the mercaptan, at least 0.25 mol of oxygen per mol of mercaptan employed.

2. In the process of preparing 1,3-butadiene-styrene elastomers in which the 1,3-butadiene-styrene interpolymer is produced by emulsion polymerization of the monomers, the steps which comprise incorporating in the butadiene-styrene elastomer latex from 1% to 4% of an arylmercaptan selected from the group consisting of the arylmercaptans of the benzene and the naphthalene series, and, while said latex is held at temperatures of from 50° to 95° C., incorporating in the latex at least 0.25 mol of oxygen, per mol of mercaptan employed.

JOSEPH H. TREPAGNIER.

REFERENCES CITED

The following references are of record in the file of this patent:

UNITED STATES PATENTS

| Number | Name | Date |
|---|---|---|
| 2,316,949 | Garvey | Apr. 20, 1943 |
| 2,317,385 | Koch | Apr. 27, 1943 |
| 2,338,427 | Gumlich | Jan. 4, 1944 |
| 2,344,843 | Wellman | Mar. 21, 1944 |